S. J. KELLY.

COIN CONTROLLED LOCK.

APPLICATION FILED OCT. 30, 1911.

Reissued July 1, 1913.

13,587.

2 SHEETS—SHEET 1.

Witnesses:
Gerstmaz.
W. F. Young.

Inventor
Samuel J. Kelly
By his Attorney
A. Alexander Thomas

S. J. KELLY.

COIN CONTROLLED LOCK.

APPLICATION FILED OCT. 30, 1911.

Reissued July 1, 1913.

13,587.

2 SHEETS—SHEET 2.

Witnesses:

Gerstmarz.

W. H. Young.

Inventor

Samuel J. Kelly

By his Attorney

A. Alexander Thomas

UNITED STATES PATENT OFFICE.

SAMUEL J. KELLY, OF WHITE PLAINS, NEW YORK, ASSIGNOR TO AUTOSALES GUM AND CHOCOLATE COMPANY, A CORPORATION OF NEW YORK.

COIN-CONTROLLED LOCK.

13,587. Specification of Reissued Letters Patent. Reissued July 1, 1913.

Original No. 959,753, dated May 31, 1910, Serial No. 527,738. Application for reissue filed October 30, 1911. Serial No. 657,687.

*To all whom it may concern:*

Be it known that I, SAMUEL J. KELLY, a citizen of the United States, residing at 10 Robinson avenue, White Plains, county of Westchester, and State of New York, have invented certain new and useful Improvements in Coin-Controlled Locks, fully described and represented in the following specification and the accompanying drawings, forming a part of the same.

This invention relates to that class of receptacles which is used to inclose a single package, and having a coin-controlled lock which by the insertion of a coin secures the release of the package, and leaves the coin inclosed within the receptacle, from which it can only be released by a key.

The invention may be applied to any suitable part of the receptacle to retain the package therein and to release it by means of a coin, and is so constructed that it may be readily embodied in the cover of a receptacle, and so arranged that the insertion of the coin and the manipulation of a coin-slide serve to unlock the cover and permit the removal of the package.

In this application of the invention, the cover of the receptacle is formed as a hollow box with a bottom plate and a lid fixed permanently thereon, and provided with an aperture to insert the coin and with a bolt-carrier manipulated by means of the coin-slide to unlock the cover from the receptacle, the coin-slide being simultaneously secured with the cover by a latch which prevents its retraction, or any exposure of the coin, until a key is inserted to release the latch.

Figure 3:
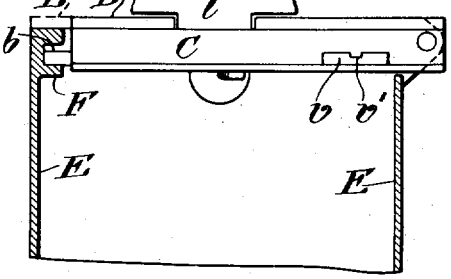

In the annexed drawing, the receptacle is only shown in a part of the figures, and only its upper end shown in Figure 3, as the nature of the receptacle itself is immaterial to the present invention.

Figure 1:
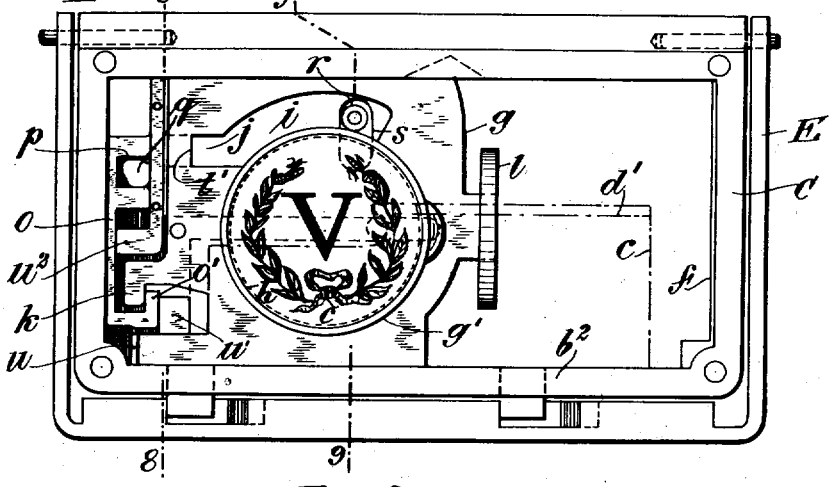
Figure 2:
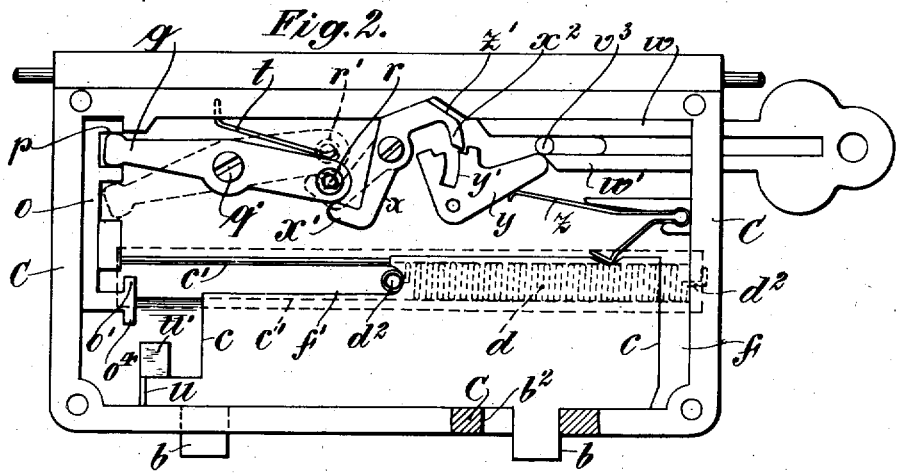
Figure 4:
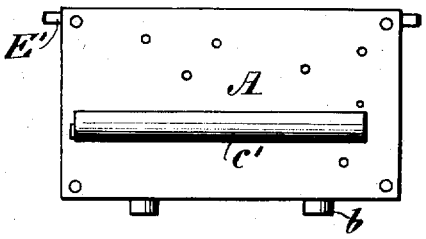
Figure 6:
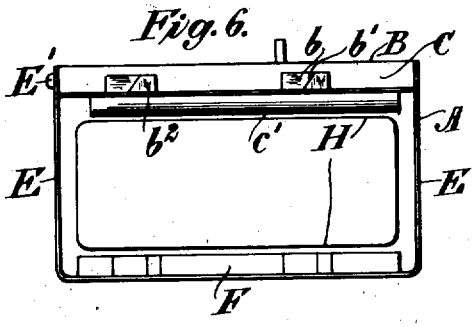
Figure 5:
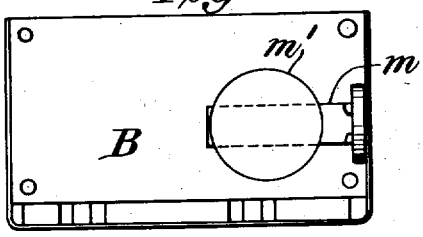
Figure 8:
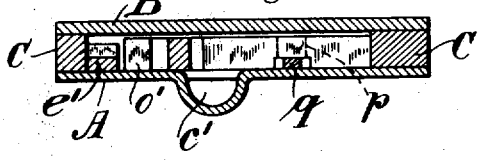
Figure 7:
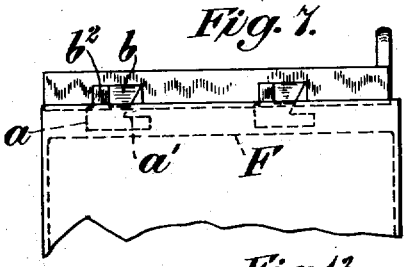
Figure 12:
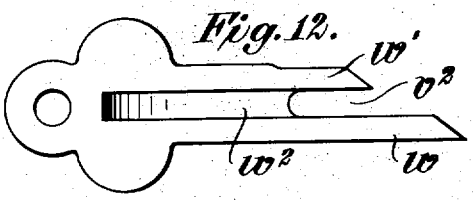
Figure 9:
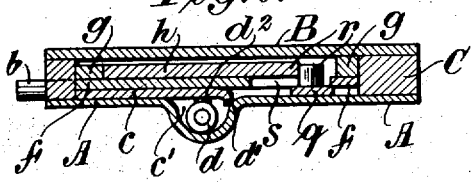
Figure 10:
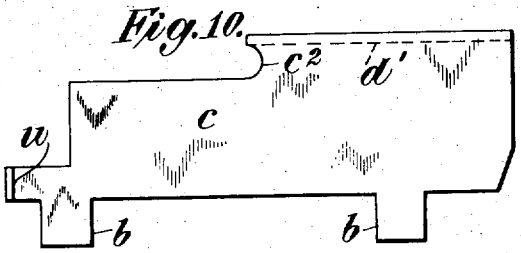
Figure 10A:
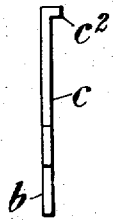
Figure 11:
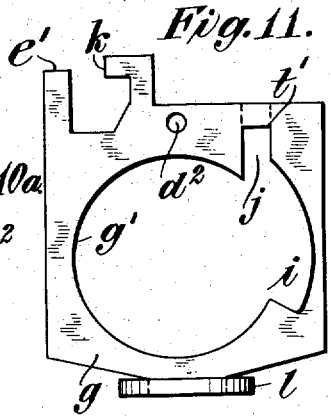

Fig. 1 is a plan of the receptacle with the cover having its lid or outer plate removed to expose the mechanism, and the bolts disengaged from their guard; Fig. 2 is a plan of the cover with the bolts in the reverse position; Fig. 3 is a cross section of the receptacle near the top end, with an end view of the cover therein. These figures are drawn much enlarged to show the construction clearly. Fig. 4 shows the under side of the cover; Fig. 5 shows the receptacle with the cover closed and locked; Fig. 6 shows the receptacle with the cover entirely open and the bolts held unlocked, as by the action of the coin in the coin-slide; Fig. 7 shows the top of the receptacle, opposite the hinge of the cover, with the cover in position for closing by forcing the bolts down into the guards; Fig. 8 is a cross section on line 8—8 in Fig. 1; Fig. 9 is a cross section on line 9—9 in Fig. 1; Fig. 10 is a plan of the bolt-carrier; Fig. $10^a$ an end view of the same; Fig. 11 a plan of the coin-slide; Fig. 12 a plan of the key, and Fig. 13 an end view of the same.

As the cover forms a lock-case, it will be so termed in the following description.

It consists of a bottom plate A, a lid B, and an intermediate frame C to which the bottom and lid are secured. The cover is hinged to the top of the receptacle by pivots E′, and the front edge of the receptacle is formed with a guard-plate F having notches *a* to admit the bolts and shoulders *a′* to retain the bolts in the notches, the end of the shoulder being beveled so that the bolts when pressed into the guard may be moved automatically.

Two bolts *b* are shown projecting from the front edge of the cover in Figs. 6 and 7, each having a sloping face *b′* to engage the sloping face upon the shoulder of the guard. The bolt-carrier *c* is a flat plate lying upon the bottom A of the lock-case, as shown in Fig. 9, and two bolts *b* are projected from its edge through slots $b^2$ in the front of the frame C. The inner edge of the carrier extends half way across the width of the lock-case as shown in Fig. 2. A channel *c′* is formed in the bottom A beneath one edge of the bolt-carrier, to receive a spiral spring *d*. This edge of the bolt-carrier is formed with a flange *d′* fitting within one edge of the slot to guide the carrier in its movement. A partition-plate *f* fills the space within the frame C, over the bolt-carrier, and the coin-slide *g* lies over the same, and is formed in the middle with a circular aperture *g′* to receive a coin *h*, and with a curved slot *i* at one edge of the aperture from which a passage *j* extends to one end of the slide. This end of the slide is provided with a transverse hook *k* to engage a latch, and at the opposite end with a thumb-piece $l$ which projects through a slot $m$ in the lid B.

When in position to receive the coin, the aperture $g'$ stands in line or beneath a similar aperture $m'$ in the lid B. A latch-bar $o$ is movable in one end of the lock-case and provided with a latch $o'$ to engage the hook $k$ upon the coin-slide, and with a notch $p$ in which one end of a latch-lever $q$ is fitted. The latch-lever is pivoted to the bottom A by a screw $q'$, and its opposite end is provided with a roller $r$ to be actuated by the edge of the coin $h$. Blocks $u'$ guide the latch-bar in the lock-case. A slot $s$ is formed in the partition $f$ through which the roll passes as indicated at $r$ in Fig. 9, the roll passing into the slot $i$ in the coin-slide, in which slot it moves in a curved path by contact with the edge of the coin when the coin-slide is pushed into the lock-case.

The latch-bar and latch-lever are held normally in the position shown in Fig. 2 by a spring $t$, and the roll then stands near enough to the center of the coin to be pushed laterally when the coin-slide is moved, and into the position shown in full lines in Fig. 1 and in dotted lines $r'$ in Fig. 2.

A bridge $t'$ shown in Figs. 1 and 11 is formed across the end of the slot $j$ in the coin-slide, and is grooved on the under side for the roll to enter such slot.

The latch-bar is so proportioned that when the roll is thus pushed outward, the latch $o'$ falls below the hook $k$ upon the coin-slide, and the coin-slide passes over it as it is moved forward.

The slot $i$ in the slide passes beyond the highest point of the coin, and the movement of the slide permits the roll to move slightly in the reverse direction, after it passes the center of the coin, which engages the hook $k$ with the latch and locks the coin-slide within the case.

To release the coin-slide, the roll with the latch-lever must be shifted from the position indicated by the letter $r$ into the position indicated by dotted lines and the letter $r'$ in Fig. 2, and any key adapted to thus shift the lever in opposition to the spring $t$ serves to release the coin-slide from the latch. The spring $d$ in the channel $c'$ is attached to one end of the channel by a shank $d^2$, and at the opposite end is attached to a stud $d^2$ upon the coin-slide, thus serving to hold the slot normally under the aperture $m'$ in the lid. The partition $f$ is formed with a slot $f'$ to permit such movement of the stud $d^2$ as the spring is expanded. The bolt-carrier is formed with a notched shoulder $c^2$ which engages the stud when the spring is wholly retracted as shown in Fig. 2, and operates to retract the bolt-carrier whenever the same be pushed toward the left to unlock the bolts from the guard F. The spring thus operates to hold the bolts normally engaged with the guard F when the coin-slide is under the aperture $m'$, thus locking the cover on the receptacle.

The bolt-carrier is formed at its left hand end with an upturned lug $u$ with which the end $e'$ of the coin-slide contacts when it is pushed into engagement with the latch $o'$, thus shifting the bolts into the position indicated upon the cover in Fig. 6 and releasing them, if locked from their engagement with the guard F.

With the slide and the coin thus pushed in, the lid is unlocked, and the package H indicated in Fig. 6 can be removed from the receptacle, the receptacle having usually a spring in the bottom to push the package upwardly to be readily grasped.

Figure 13:
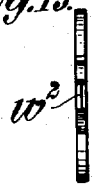

The keyhole $v$ is shown as an oblong slot in Fig. 3 close to the bottom A, with a ward or tongue $v'$ to engage a groove marked $w^2$ in Figs. 12 and 13 in the key, which is formed with two prongs $w$, $w'$, of different lengths, for the purpose to be described.

Any keyhole in line with the latch-lever $q$ would permit the insertion of an implement to actuate such lever, and to prevent such tampering with the lock a tumbler mechanism is disposed between the lever and the keyhole which can be actuated only by a compound key, such as is shown in Fig. 12. A release-lever $x$ is pivoted near the end of the latch-lever and provided at one end with a finger $x'$ to contact with the latch-lever, and upon the opposite end with a tumbler $x^2$ to engage a notch in a locking-lever. The locking-lever $y$ is pivoted adjacent, and provided with a notch $y'$ adapted to admit the tumbler $x^2$, but held normally in position to repel such tumbler by means of a spring $z$ operating upon the arm of the lever $y$. A sloping seat $z'$ is shown upon the release-lever in line with one edge of the keyhole, and the end of the locking-lever is nearly in line with the opposite edge. The prongs $w$, $w'$ upon the key are separated by a slot $v^2$ which embraces a pin $v^3$ within the lock-case to guide the key, and the prongs are formed with sloping ends adapted successively to engage the locking-lever and the release-lever, throwing the first one into position where the tumbler can enter the notch $y'$ and then moving the release-lever so as to press the finger $x'$ against the latch-lever, so as to release the latch from the coin-slide.

So long as the key remains in contact with the locking-lever and release-lever, it holds them in such position in opposition to the spring $z$, during which time the coin-slide can be retracted and the key then withdrawn from the keyhole. The spring $t$ then throws the latch-bar upward and the roll $r$ downward as in Fig. 2, which removes the release-lever and the locking-lever to the position shown in that figure.

The retraction of the coin-slide to its initial position presses the stud $d^2$ against the shoulder $c^2$ upon the bolt-carrier and draws the carrier also back to its initial position shown in Fig. 2, and leaves the carrier under the control of the spring $d$, which enables it to yield when the cover is pressed shut by crowding the beveled faces $b'$ of the bolts into contact with the shoulders of the guard.

The lid B of the cover is preferably formed, as shown in Fig. 3, with a projection marked B′, covering the edge of the guard to prevent access to the bolts; but such projection is not shown in any of the other figures, as it would conceal the disposition of the bolts.

It will be observed that the coin remains in the coin-slide when the cover is unlocked, and can only be recovered by retracting the slide to its initial position, which is effected by the action of the key upon the latch which locks the slide. This mechanism does not, therefore, require any receptacle to receive the coins, nor any provision for discharging the coin from the coin-slide, as the receptacle is intended only to contain a single package, and provision is only made in the locking mechanism to receive and store a single coin. After the coin is removed and a fresh package placed in the receptacle, the mechanism holds the bolts under spring control, so that the cover can be snapped shut without the use of a key, thus securing a considerable saving of time on the part of the operator.

The arrangement of the tumbler or release mechanism between the latch-lever and the keyhole completely prevents the intrusion of any implement to pick the lock.

It will be understood that the operation of the coin upon the roller $r$ and the latch-bar $c$ lowers the latch just sufficient for the dog $k$ upon the coin-slide to pass over it, the result of which construction is that if any coin smaller than a nickel be placed in the coin-slide it will not actuate the roller and latch-bar sufficiently for the dog $o'$ to engage the hook on the slide. The outer side of the latch forms a stop to prevent the latching of the coin-slide.

When the slide is released from the finger it will, therefore, be returned to its initial position by the spring $d$ and the coin can be removed by the person who inserted it, instead of remaining in the machine, as in most other constructions. A safety-lug $o^4$ is shown in Fig. 2 upon the lower end of the latch-bar, which operates if the latch is forced too far down by the insertion of any improper article within the coin-slide, as a flat piece of wood or metal, to intercept the lug $u$ upon the bolt-carrier and thus prevent the moving of the bolt-slide far enough to engage the latch. The end $e'$ of the coin-slide would then be arrested by the lug $u$, which would prevent the unlocking of the case and cause the bolt-slide to return to its initial position. The slide can only become locked and the bolt unlocked if a coin of normal size be used.

Having thus set forth the nature of the invention what is claimed herein is:

1. In a coin-operated lock, the combination, with a bolt-carrier and a bolt projected therefrom, of a coin-slide for shifting the carrier to unlock the bolt, a latch-bar having a latch engaged with the coin-slide when the latter is pushed into the case with the coin, and the case having a keyhole with a detachable key adapted to retract the latch-bar from engagement with the coin-slide, whereby the coin-slide may be shifted to its initial position to remove the coin.

2. In a coin-controlled lock, the combination, with a lock-case E having a movable bolt-carrier $c$ with a bolt $b$ projected therefrom and a spring $d$ to hold the bolt normally engaged with its guard, of a coin-slide $g$ movable over the bolt-carrier and actuated also by the said spring, and having a pocket $g'$ for the coin $h$ and a slot $i$ in the coin-slide at one side of the pocket and having a toe $e'$ operating at the end of its movement to shift the bolt-carrier to retract and unlock the bolt, and having a hook $k$ to engage a latch, a latch-bar $o$ having the latch $o'$ to engage the hook $k$, a pivoted latch-lever $q$ jointed at one end to the latch-bar and having a roll $r$ projected into the slot $i$, the coin operating upon the roll to retract the latch-bar until the hook and latch become engaged, whereby the coin-slide is locked within the case with the coin.

3. In a coin-controlled lock, the combination, with a case E having a movable bolt-carrier $c$ with a bolt $b$ projected therefrom and a spring $d$ to hold the bolt normally engaged with its guard, of a coin-slide $g$ movable over the bolt-carrier and actuated also by the said spring, and having a pocket $g'$ for the coin $e$ and a slot $i$ in the slide at one side of the pocket and having a toe $e'$ operating at the end of its movement to shift the bolt-carrier to retract and unlock the bolt, and having a hook $k$ to engage a latch, a latch-bar $o$ having the latch $o'$ to engage the hook $k$, a pivoted latch-lever $q$ jointed at one end to the latch-bar and having a roll $r$ projected into the slot $i$, the coin operating upon the roller to retract the latch-bar until the hook and latch become engaged, a tumbler actuated by the latch-lever, and the case having a keyhole with a key adapted to shift the tumbler, the latch-lever and the latch-bar, whereby the coin-slide may be retracted to its initial position to remove the coin.

4. In a coin-operated lock, the combination, with a bolt-carrier and a bolt projected therefrom, of a coin-slide for shifting the carrier to unlock the bolt, a latch-bar having a latch engaged with the coin-slide, a latch-lever $q$ having a roll $r$ actuated by the coin to engage the latch with the coin-slide, a release-lever $x$ having a tumbler $x^2$ thereon and a seat $z'$ to engage a key, a locking-lever $y$ to engage the said tumbler, with an arm to engage the key, and the case having a keyhole with key adapted to first shift the locking-lever, and then the release-lever, and thereby shifting the latch-lever and the latch-bar to permit the retraction of the coin-slide and the removal of the coin.

5. The combination, with a receptacle for containing a package and a cover adapted to retain the package in the receptacle, of coin-actuated locking mechanism for holding the cover closed, said mechanism embracing a lid with a circular aperture for inserting the coin, a coin-slide movable beneath the lid and provided with a corresponding aperture, means actuated by the coin when moved beneath the lid with the coin-slide for unlocking the cover, means engaging the coin to retain it under the lid, and means for releasing the coin-slide and restoring it to its initial position, whereby the coin can be removed through the same aperture by which it was inserted.

6. The combination, with a receptacle for containing a package, of a box-cover forming a lock-case having a movable bolt-carrier in the bottom with bolt projected through the edge of the cover, a guard upon the receptacle to engage such bolt, a coin-slide lying over the bolt-carrier and movable with a coin to shift the bolt, a latch-bar having a latch engaged with the coin-slide when the latter is pushed into the case with a coin, and the case having a keyhole, with a key constructed and operated to retract the latch-bar and permit the shifting of the coin-slide to its initial position.

7. In a coin-operated lock, the combination, with a bolt-carrier and a bolt projected therefrom, of a coin-slide for shifting the carrier to unlock the bolt, the coin-slide having a hook to engage a latch, a latch-bar having a latch and means actuated by a normal coin in the coin-slide to move the latch sufficiently to engage the hook upon the coin-slide, and a stop upon the latch arranged and operated to prevent the engagement of the hook therewith upon any lesser movement than is effected by a normal coin.

8. In a coin-operated lock, the combination of a locking member, a reciprocable coin-slide for actuating said member into unlocking position, latch mechanism adapted to be operated by the coin in the slide to permit shifting of the coin-carrying slide into final or operated position, whereby said locking member is actuated into unlocking position, said latch mechanism automatically locking the coin-slide in its operated position, and a key adapted to move said latch mechanism out of locking engagement with the coin-slide, so that the latter may be shifted to its initial position for the removal of the coin.

9. In a coin-operated lock, the combination of a locking member, a reciprocable coin-slide for actuating said member into unlocking position, and latch mechanism adapted to be operated by the coin in the slide to permit shifting of the coin-carrying slide into final or operated position, whereby said locking member is actuated into unlocking position, said latch mechanism automatically locking the coin-slide in its operated position and being key-controlled so that it may be moved out of locking engagement with the coin-slide to permit the latter to be shifted to its initial position for the removal of the coin.

10. In a coin-operated lock, the combination of a suitable casing provided with a coin opening, a locking member, a reciprocable coin-slide for actuating said member into unlocking position, and a coin-controlled and key-controlled latch device for releasing the coin-carrying slide for operation from initial to final position and from final back to initial position, whereby the coin may be removed from the coin-slide through the opening in the casing.

11. The combination with a suitable receptacle provided with a hinged top or cover having a coin opening, of coin-operated locking mechanism carried by said top or cover for locking the same in closed position, said locking mechanism comprising a locking member, a reciprocable coin-slide mounted in said cover for actuating said member into unlocking position, and a coin-controlled and key-controlled latch device for permitting movement of said coin-slide from initial to final position and from final back to initial position, whereby the coin may be removed from the coin-slide through said opening in the cover.

12. In a coin-operated lock, a combination of locking means, a reciprocable coin-slide adapted to engage said means for actuating the same into unlocking position, and a coin-controlled and key-controlled latch device for releasing said coin-slide for operation from initial to final position and from final back to initial position, so that the coin may be removed from the coin-slide.

13. In a coin-controlled vending machine having a casing, the combination of a horizontally movable slide adapted to engage and move the deposited coin into operative position, a handle on said slide extending outside of the casing to permit manual operation of said slide, a slidable locking bar for said slide, a projection on said slide arranged to abut against said bar when the latter is in locking position, and a pivoted lever having one end connected with said locking bar and the other end so arranged with respect to said slide that the deposited coin is held edgewise between said slide and said lever and is carried bodily by said slide into and out of operative engagement with said lever, whereby the coin rocks said lever to shift said locking bar out of the path of movement of said projection on the slide.

14. In a coin-controlled vending machine, the combination of a horizontally movable hand-operable slide adapted to engage and move the deposited coin into operative position, a locking member arranged to project normally into the path of movement of said slide to prevent operation thereof, and a pivoted lever operatively connected with said locking member and having a portion so arranged with respect to said slide that the deposited coin is held edgewise between said slide and said lever and is carried bodily by said slide into and out of operative engagement with said lever, whereby the coin rocks said lever to move said locking member out of the path of movement of said slide.

15. In a coin-controlled vending machine, the combination of a horizontally movable hand-operable slide adapted to engage and move the deposited coin into operative position, a locking member arranged normally to prevent operation of said slide, and a pivoted lever having at one end a loose connection with said locking member and having its other end so arranged with respect to said slide that the deposited coin is held edgewise between said slide and said lever and is carried bodily by said slide into and out of operative engagement with said lever, whereby the coin rocks said lever to move said locking member into unlocking position.

16. In a coin-controlled vending machine, the combination of a horizontally movable hand-operable slide adapted to engage and move the deposited coin into operative position, a slidable locking member arranged to project normally at one end into the path of movement of said slide to prevent operation thereof, and a pivoted lever having a loose connection with the other end of said locking member and having a portion so arranged with respect to said slide that the deposited coin is held edgewise between said slide and said lever and is carried bodily by said slide into and out of operative engagement with said lever, whereby the coin rocks said lever to move said locking member out of the path of movement of said slide.

17. In a coin-controlled vending machine, the combination of a horizontally movable hand-operable slide adapted to engage and move the deposited coin into operative position, a locking member arranged to project normally into the path of movement of said slide to prevent operation thereof, a pivoted lever operatively connected with said locking member and having a portion so arranged with respect to said slide that the deposited coin is held edgewise between said slide and said lever and is carried bodily by said slide into and out of operative engagement with said lever, whereby the coin rocks said lever to move said locking member out of the path of movement of said slide, and a spring for normally holding said lever and locking member in locking position.

18. In a coin-controlled vending machine having a casing, the combination of a horizontally movable slide adapted to engage and move the deposited coin into operative position, a handle on said slide extending outside of said casing to permit manual operation of said slide, a slidable locking bar for said slide, guiding means for said slidable bar, a projection on said slide arranged to abut against said bar when the latter is in locking position, a pivoted lever having one end connected with said locking bar and the other end so arranged with respect to said slide that the deposited coin is held edgewise between said slide and said lever and is carried bodily by said slide into and out of operative engagement with said lever, whereby said lever is rocked to shift the locking bar out of the path of movement of said projection on the slide, and a spring for normally holding said lever and locking bar in locking position.

19. In a coin-controlled vending machine, the combination of a horizontally movable hand-operable slide adapted to engage and move a deposited coin into operative position, a slidable locking member arranged to project normally into the path of movement of said slide to prevent operation thereof, guiding means for said slidable member, a pivoted lever operatively connected with said locking member and having a portion so arranged with respect to said slide that the deposited coin is held edgewise between said slide and said lever and is carried bodily by said slide into and out of operative engagement with said lever, whereby said lever is rocked to shift said locking member out of the path of movement of said slide, and a spring for normally holding said lever and locking member in locking position.

20. The combination with a suitable receptacle provided with a hinged cover having a coin-opening, of a coin-slide mounted in said cover and adapted to receive the deposited coin to carry the same into operative position, means for operating said coin-slide from the outside of the receptacle, means for normally locking said slide against operative movement, means operated by the coin in the slide for moving said locking means into releasing position to permit full movement of said slide and thereby release said cover, said coin-slide remaining locked in its operated position to retain the deposited coin, and key-controlled means operable from the outside of the receptacle to release said coin-slide for movement into initial position, so that the deposited coin may be removed from the coin-slide through said coin opening.

21. In a coin-operated lock, the combination of a slidable coin-carrier adapted to receive the deposited coin and carry the same into operative position, means for actuating said coin-slide by hand, mechanism for normally locking said coin-slide against operative movement and adapted to be moved into releasing position by the coin in the carrier to permit full operative movement of the latter, said mechanism locking the carrier in operated position to retain the deposited coin, and means for operating said mechanism to release the operated coin-carrier for movement back into initial position, so that the deposited coin may be exposed for withdrawal.

In testimony whereof, I hereunto subscribe my name this 18th day of Oct. 1911.

SAMUEL J. KELLY.

Witnesses:
A. J. Ewing,
E. H. Elmstetter.